(12) United States Patent
Goldman

(10) Patent No.: US 6,706,176 B1
(45) Date of Patent: Mar. 16, 2004

(54) BIOLOGICAL FILTER ATTACHMENT FOR AQUARIUM HANG-ON FILTERS

(75) Inventor: Terry Irwin Goldman, Lloyd Harbor, NY (US)

(73) Assignee: Penn-Plax, Inc., Garden City, NY (US)

( * ) Notice: Subject to any disclaimer, the term of this patent is extended or adjusted under 35 U.S.C. 154(b) by 0 days.

(21) Appl. No.: 10/444,120

(22) Filed: May 23, 2003

(51) Int. Cl.[7] ................ A01K 63/04; B01D 35/027

(52) U.S. Cl. ................ 210/169; 210/219; 210/151; 119/261

(58) Field of Search .................. 210/169, 151, 210/232, 416.2, 150, 219; 119/227, 260, 261

(56) References Cited

U.S. PATENT DOCUMENTS

| 4,915,828 A | * | 4/1990 | Meyers et al. ............. 210/110 |
| 5,108,594 A | * | 4/1992 | Giovanetti et al. ......... 210/151 |
| 5,176,824 A | * | 1/1993 | Willinger et al. .......... 210/151 |
| 5,460,722 A | * | 10/1995 | Chen ........................ 210/615 |
| 5,474,673 A | * | 12/1995 | Ludlow ..................... 210/151 |
| 5,632,887 A | * | 5/1997 | Gargas et al. .............. 210/151 |
| 5,728,293 A | * | 3/1998 | Guoli et al. ................ 210/151 |
| 5,832,870 A | * | 11/1998 | Lin ............................ 119/261 |

* cited by examiner

*Primary Examiner*—Fred G. Prince
(74) *Attorney, Agent, or Firm*—Kubovcik & Kubovcik

(57) ABSTRACT

A biological filter for an aquarium hang-on filter that attaches to the outflow of the aquarium hang-on filter. The biological filter includes a multiplicity of convoluted plastic channels over which water exiting the aquarium hang-on filter cascades and on the surfaces of which aerobic bacteria can form.

4 Claims, 5 Drawing Sheets

BIOLOGICAL FILTER ATTACHMENT FOR AQUARIUM HANG-ON FILTERS

FIELD OF THE INVENTION

This invention relates, generally, to external, hang-on filters for aquarium tanks and, more specifically, to a biological filter that attaches to the outflow of external, hang-on filters and provides abundant surface area for growth of aerobic bacteria and increased oxygen transfer into the aquarium water.

BACKGROUND OF THE INVENTION

Tank mounted, or hang-on, external filters are used to mechanically and chemically filter and purify aquarium water to eliminate undesirable wastes and toxins and to maintain a healthy, aquarium environment. Such filters also typically include biological filters for removing fish waste byproducts such as ammonia, nitrates and nitrites from the water. These biological filters provide a surface for the growth of aerobic bacteria which help to break down the fish waste byproducts and prevent toxic waste buildup in the aquarium.

A known biological filter for an external, hang-on, aquarium comprises plastic plates having convoluted channels that is placed within the filter container. The problem with this filter is that the channels are under water and do not allow aerobic bacterial growth, only anaerobic. Also there is no additional oxygen exchange into the aquarium water. To remedy this problem a venturi type air suction valve and tube is place through the filter case, sending air to the bottom of the convoluted channel wall, providing air. (See, for example, U.S. Pat. No. 5,728,293). The problem with a venturi type air suction valve is that it is quite noisy due to the air suction and is, therefore, unacceptable to most hobbyists.

A second method of accomplishing the desired result of aerobic bacterial growth and oxygen exchange, has been to provide a wheel of convoluted reinforced paper, (similar to a paddle wheel) at the filter outflow. (See, for example, U.S. Pat. No. 5,423,978). This apparatus improves the growth of aerobic bacteria, but the wheel is a moving part and, after extended use, often jams due to the accumulation of fish tank crude. Also, the wheel will often make noise as it moves with the water.

OBJECT OF THE INVENTION

An object of the present invention is to provide a biological filter that solves the problems of known biological filters and provides improved growth of aerobic bacteria and enhanced oxygen exchange with the aquarium water.

SUMMARY OF THE INVENTION

In accordance with the above and other objects, a biological filter for an aquarium hang-on filter according to the present invention comprises an external filter that attaches to the outflow of the aquarium hang-on filter. The biological filter includes a multiplicity of convoluted plastic channels for the flow and agitation of water. These channels provide abundant surface area for aerobic bacteria to form and, by placement at the outflow of the filter, there is sufficient air exchange to allow aerobic bacteria growth. Additionally, the attachment provides the beneficial function of increasing oxygen transfer into the water. The water leaving the filter is split and agitated allowing more surface contact of the water with the air. This increased oxygenation of the aquarium water is beneficial to the fish. These advantageous functions are accomplished without moving parts.

DETAILED DESCRIPTION

Figure 1:
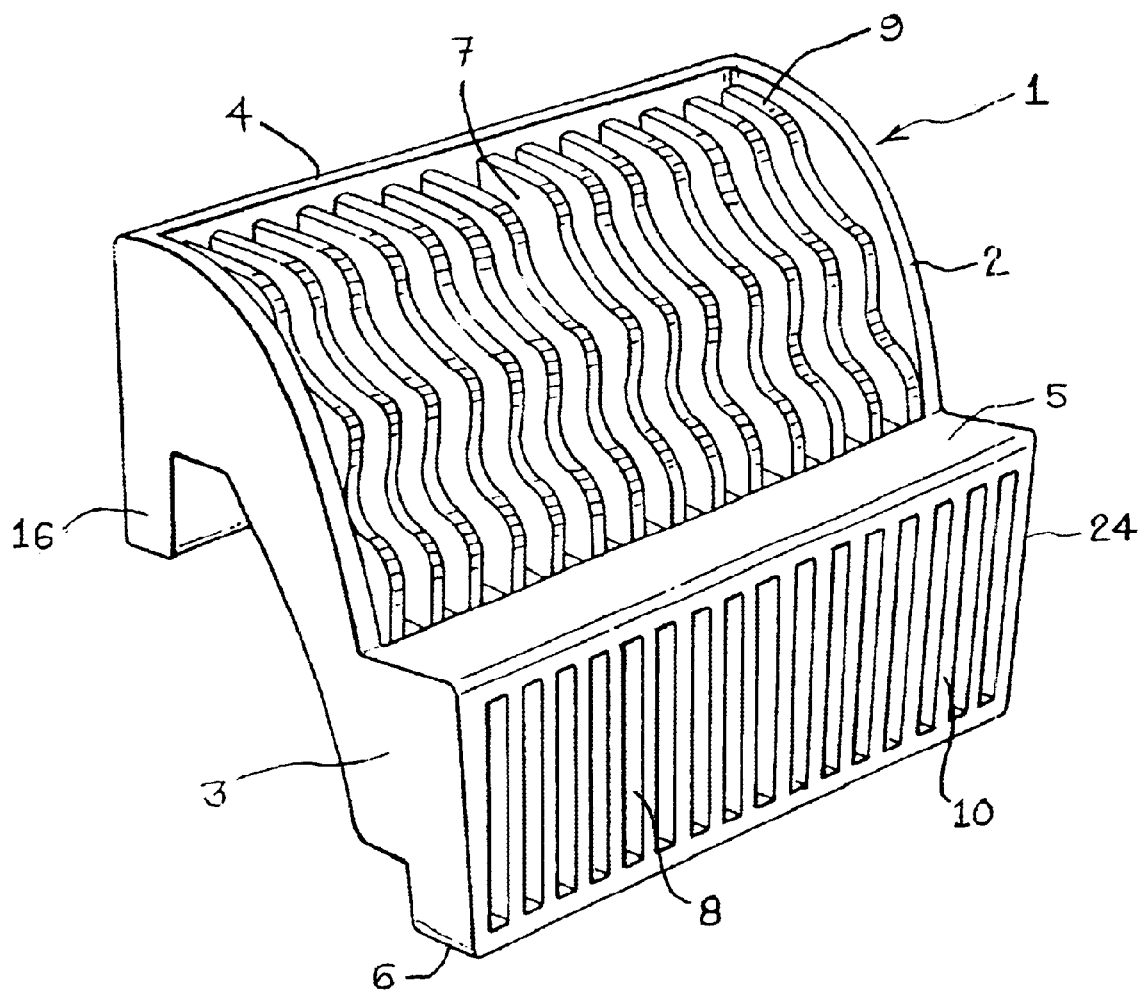
FIG. 1 is a perspective view of an embodiment of the biological filter for an aquarium hang-on filter according to the present invention.
Figure 2:
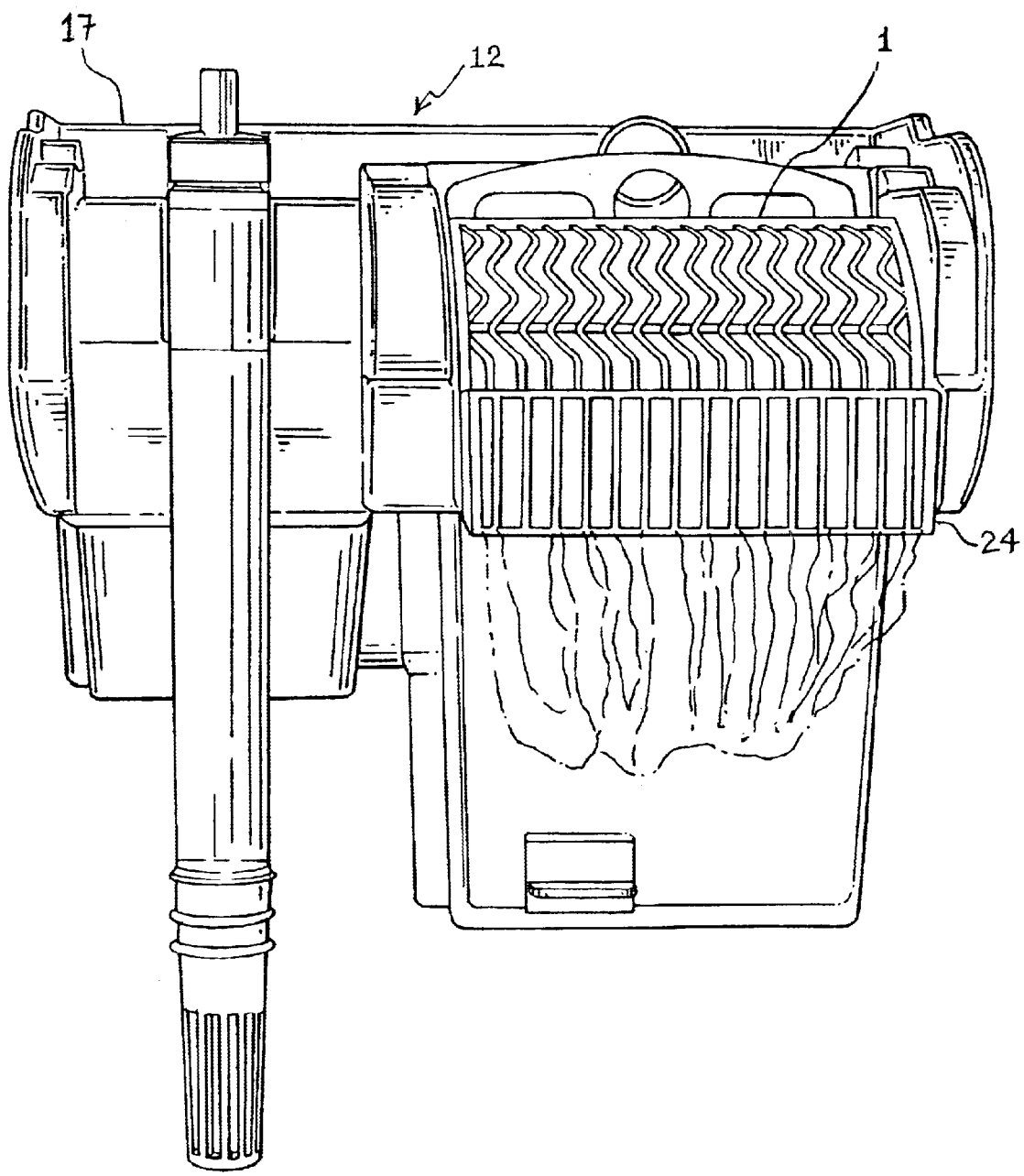
FIG. 2 is a perspective view of the biological filter according to the present invention attached to the outflow of an aquarium hang-on filter with the cover removed.
Figure 3:
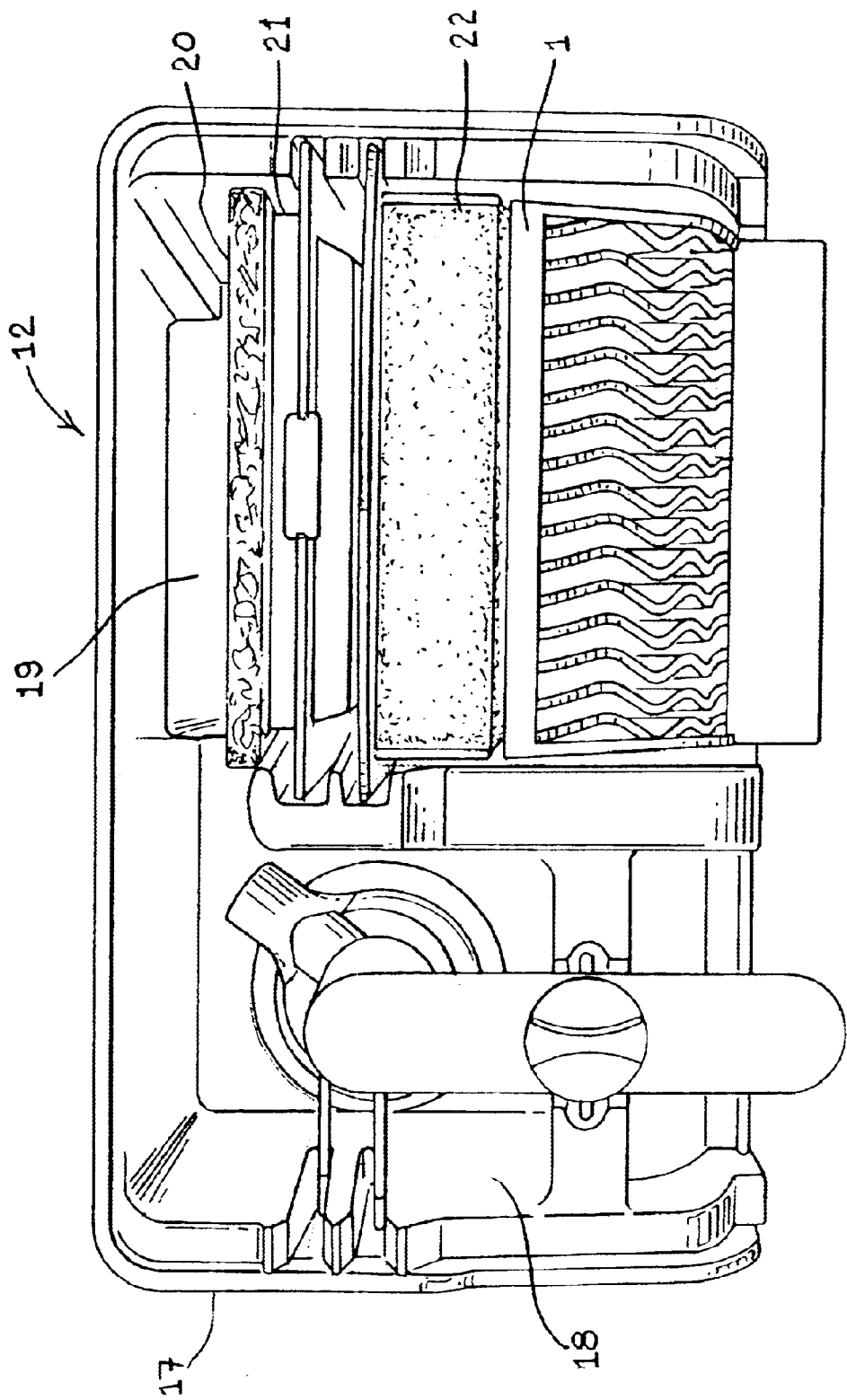
FIG. 3 is a top plan view of the biological filter and aquarium hang-on filter of FIG. 2.

Referring now in detail to the drawings and, initially, to FIG. 1, a preferred form of the biological filter of the present invention is generally indicated by reference numeral 1, and includes side walls 2, 3 joined together by top walls 4, 5 and bottom wall 6. Arms 16 are provided on side walls 2 and 3 for attaching biological filter 1 to a hang-on aquarium filter. A plurality of open channels 7, 8 extending from top to bottom and from back to front of the biological filtration means are formed between the side walls 2, 3 by channel walls 9, 10.

Channel walls 9 extend in a generally vertical direction between top walls 4, 5 and are preferably non-planar, or convoluted or curvilinear. Non-planar walls increase the surface area on which aerobic bacteria can form. Additionally, water flowing from the top to the bottom of the channels 7 is caused to cascade or deflect over opposed surfaces of adjacent channel walls 9 and become agitated. Such agitation increases oxygen transfer into the water. The channel walls 9 shown in the drawings are corrugated or pleated, but the channel walls 9 can have any non-planar shape that causes agitation or turbulence in the water flowing from the top to the bottom of the channels 9. The number of channel walls and the number of corresponding channels is not limited and, preferably, is the highest number that does not impede water flow. The thickness of the channel walls is also not limited. The wall thickness should be as small (i.e., thin) as possible so as to provide a large open area for water flow while, at the same time, having sufficient structural rigidity and strength.

Channel walls 10 and channels 8 also extend in a substantially vertical direction between top wall 5 and bottom wall 6. In the embodiment shown in FIG. 1 and the other drawings, the channel walls 10 are substantially planar. However, channel walls 10 can be inclined and/or have a non-planar cross-section without affecting the functioning of the filtration means.

Referring now to FIGS. 2, 3, 4 and 5, it can be seen that the biological filter 1 of the present invention attaches to the outflow or spillway 11 of an aquarium hang-on, or external, filter 12. Aquarium hang-on filter 12 can be any hang-on filter of the type including a filter housing 17 containing a water inlet chamber 18 for receiving water from an aquarium, a filter chamber 19 for receiving the water from said water inlet chamber 18 and returning the water to the aquarium via a spillway 11. A suitable aquarium hang-on filter is shown and described in U.S. Pat. No. 5,728,293 which is incorporated herein by reference.

In the embodiment of the hang-on filter shown in the drawings, the filter chamber 19 includes a mechanical filter 20 for trapping floating particulate matter, a chemical filter 21 downstream of the mechanical filter for removing harmful chemicals, toxins, odors, discoloration and the like, and a biological-type filter 22 for providing for removing ammonia, nitrates, nitrites and the like.

The mechanical filter is typically a non-woven fibrous material that effectively traps particulate material of the type found in aquarium water. The chemical filter 21 is typically activated carbon in the form of particles, beads, granules of the like. The biological-type filter 22 shown in the drawings is a sponge-type material. The materials used for the mechanical, chemical and biological filters are not limited to those illustrated in the drawings and can be any of the filters known in the art for performing these functions. Additionally, the internal biological-type filter 22 can be eliminated entirely in view of the fact that the function of this filter is performed in the present invention by the external biological filter 1. A cover 23 is placed over the top of the filter housing 17 during operation to prevent possible splashing of water out of the filter assembly.

The biological filter 1 has a bottom surface 13 formed by the bottom surfaces of the convoluted channel walls 7 that corresponds substantially to the top surface 14 of the spillway 11 and rests on the top surface 14 of the spillway. The filter is attached to the spillway by arms 16 which extend over the front wall of the filter case. Other means of attaching the filter to the spillway are also possible. For example, a groove can be provided on the upper surface of the spillway or on the filter and a rib for engaging the groove can be provided on the opposed surface. The top surface 25 of the biological filter 1 formed by the top surfaces of the convoluted channel walls 7 is generally rounded and extends from the top of the biological-type filter 22 to the top wall 5. The top surface 25 is not limited to a rounded shape and could be, for example, step-shaped. Cover 23 covers the top surface 25 of the biological filter 1 during operation with the bottom edge of the cover 23 being generally flush with the top wall 5.

Figure 4:
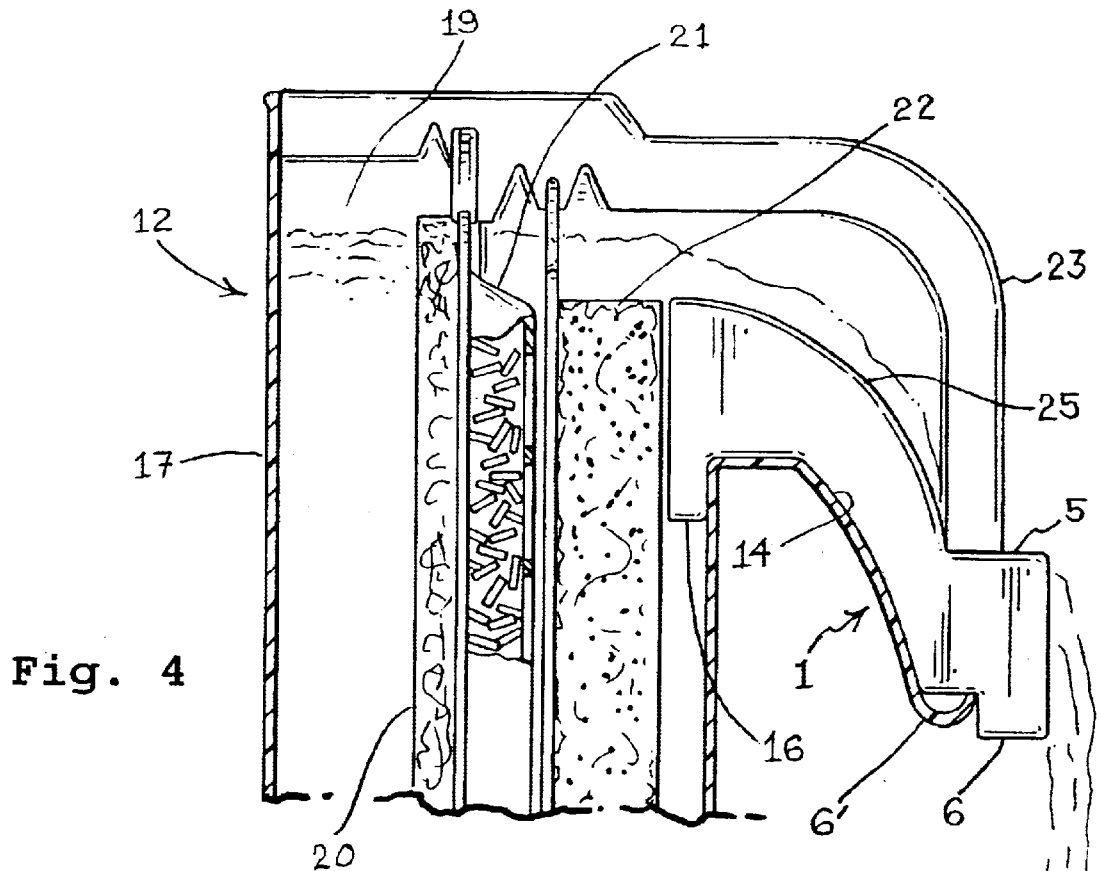
FIG. 4 is a vertical section through the aquarium hang-on filter of FIG. 2.
Figure 5:
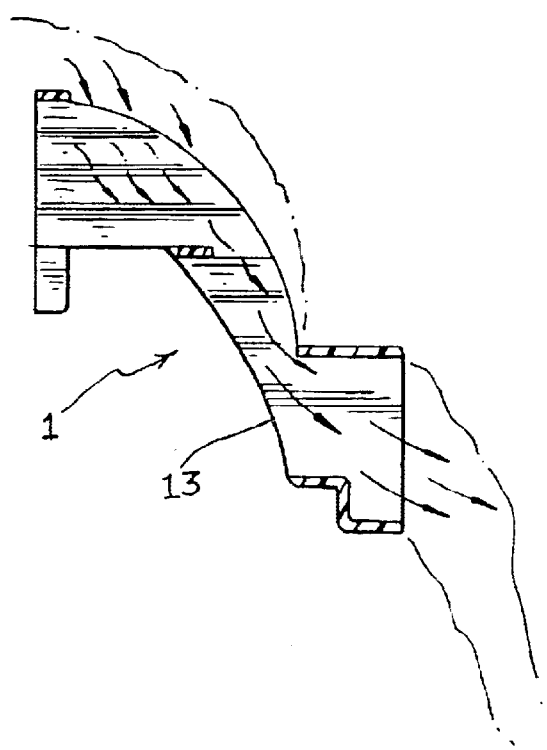
FIG. 5 is a vertical section through the biological filter of FIG. 1 illustrating the passage of aquarium water therethrough.
Figure 6:
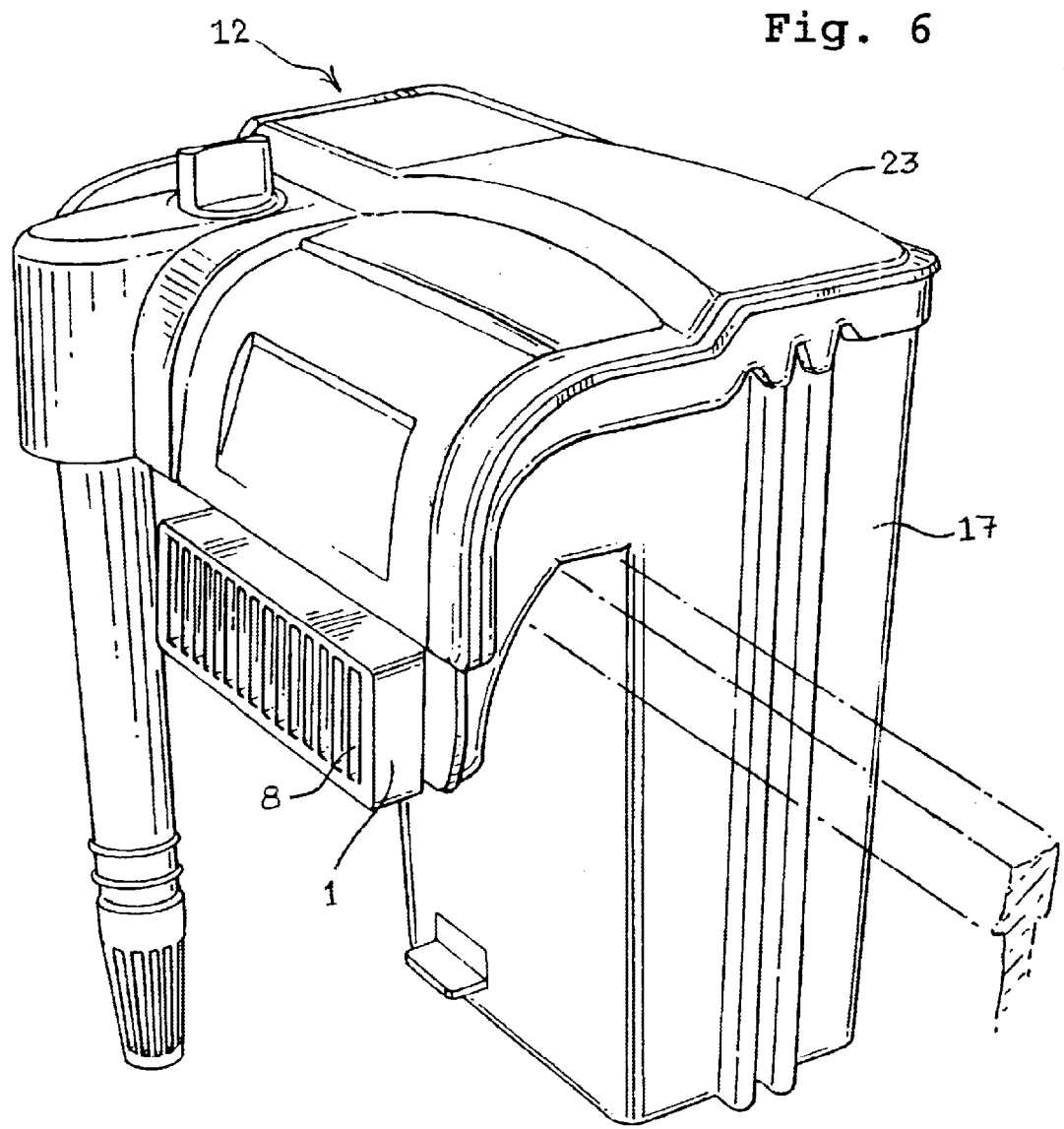
FIG. 6 shows an embodiment of the aquarium hang-on filter of the present invention mounted on the wall of an aquarium (indicated in broken lines).

As can be seen from FIGS. 4 and 5, the bottom wall 6 of the biological filter 1 has a stepped shape, such that surface 6' of the bottom wall sits on the lip 15 of the spillway 11. The lip 15 of the spillway 11 is typically turned up to increase the turbulence of water circulating back into the aquarium. The bottom wall 6 of the biological filter 1 is not limited to a stepped shape and could, for example, be curved to correspond to the turned-up lip 15 of the spillway 11. The lip 15 of the spillway 11 can also be straight to conform to bottom wall surface 6'.

The biological filter 1 of the present invention can be made of any thermoformable plastic material. The surfaces of the biological filter 1 can be textured to increase the surface area for the growth of the aerobic bacteria.

As illustrated in FIGS. 1, 4 and 5, water that flows into the filter chamber 19 from the water inlet chamber passes through the mechanical filter 20, the chemical filter 21 and the biological-type filter 22 and flows over and through the biological filter 1 and the upper surface 14 of the spillway 11 and exits the biological filter 1 through a spout 24 formed by side walls 2, 3, upper wall 5, bottom wall 6 and filter channels 8. The water as it flows through the biological filter 1 is contacted with aerobic bacteria that forms on the surfaces of the biological filter 1 whereby ammonia, nitrites and the like chemical compounds are removed. The water cascades over the channel walls 9 and through the channels 7 and is agitated to provide increased surface contact between the water and the air. The water then exits the hang-on filter 12 through the spout 24 and into the aquarium creating turbulence at the water surface which also increases contact between the water and the air and promotes oxygenation of the water.

ADVANTAGES OF THE INVENTION

The biological filter of the present invention for attaching to the outflow of an aquarium hang-on filter provides abundant surface area for the formation and growth of aerobic bacteria and provides for increased oxygen transfer into the aquarium water. The filter is not noisy, can be easily removed for cleaning, and does not have any moving parts.

What is claimed is:

1. A biological filter for attaching to an external aquarium filter having a filter housing provided with a water inlet chamber for receiving water from an aquarium, a filter chamber for receiving water from the water inlet chamber and mechanically and chemically filtering the water, and a spillway for receiving water from the filter chamber and returning the water to the aquarium, the biological filter comprising:

two vertical side walls separating a front surface and a back surface, the back surface comprising a surface corresponding to an upper surface of said spillway;

a plurality of vertically oriented channels formed by a plurality of non-planar walls arranged between the side walls and extending from the front surface to the back surface of the biological filter; and means for attaching the biological filter to the spillway of the aquarium such that, when the biological filter is attached to the external aquarium filter, water exiting the external aquarium filter flows over and through the channels and is agitated by the non-planar channel walls.

2. The biological filter according to claim 1, further comprises a spout formed at the bottom of the biological filter by a portion of the side walls and an upper and lower horizontal wall connecting said portion of the side walls and wherein a second multiplicity of channels is formed in the spout.

3. The biological filter according to claim 1, wherein said means for attaching the biological filter to the spillway of the aquarium comprises an arm on each of the side walls.

4. An external aquarium filter comprising a filter housing containing:

a water inlet chamber for receiving water from an aquarium, a filter chamber for receiving water from the water inlet chamber and mechanically and chemically filtering the water, a spillway for receiving water from the filter chamber and returning the water to the aquarium, and a biological filter attached to the spillway for providing a surface for the growth of aerobic bacteria and for returning water to the aquarium, the biological filter comprising:

two vertical side walls separating a front surface and a back surface, the back surface comprising a surface corresponding to an upper surface of said spillway;

a plurality of vertically oriented channels formed by a plurality of non-planar walls arranged between the side walls and extending from the front surface to the back surface of the biological filter; and means for attaching the biological filter to the spillway of the aquarium, wherein water exiting the external aquarium filter flows over and through the channels and is agitated by the non-planar channel walls.

* * * * *